(12) United States Patent
Kobayashi

(10) Patent No.: US 9,290,907 B2
(45) Date of Patent: Mar. 22, 2016

(54) WORK VEHICLE

(71) Applicant: KOMATSU LTD., Tokyo (JP)

(72) Inventor: Shintarou Kobayashi, Komatsu (JP)

(73) Assignee: KOMATSU LTD., Tokyo (JP)

( * ) Notice: Subject to any disclaimer, the term of this patent is extended or adjusted under 35 U.S.C. 154(b) by 61 days.

(21) Appl. No.: 14/382,865

(22) PCT Filed: Jun. 30, 2014

(86) PCT No.: PCT/JP2014/067450
§ 371 (c)(1),
(2) Date: Sep. 4, 2014

(87) PCT Pub. No.: WO2014/185552
PCT Pub. Date: Nov. 20, 2014

(65) Prior Publication Data
US 2015/0376867 A1     Dec. 31, 2015

(51) Int. Cl.
*B60K 11/00* (2006.01)
*E02F 9/08* (2006.01)
*B60K 11/04* (2006.01)
*B60K 13/04* (2006.01)

(52) U.S. Cl.
CPC ............... *E02F 9/0866* (2013.01); *B60K 11/04* (2013.01); *B60K 13/04* (2013.01)

(58) Field of Classification Search
CPC ....... E02F 9/0866; B60K 11/00; B60K 11/04; B60K 11/08; B60K 13/04; F01P 2001/005; B60Y 2200/41; B60Y 2410/114; F02M 35/10242; F02M 35/10262
See application file for complete search history.

(56) References Cited

U.S. PATENT DOCUMENTS 5,590,624 A * 1/1997 Emond ..................... F01P 5/02
123/198 E
5,839,397 A * 11/1998 Funabashi .............. B60K 11/04
123/41.01

(Continued)

FOREIGN PATENT DOCUMENTS

JP    2000-274242 A    10/2000
JP    2001-295650 A    10/2001

(Continued)

OTHER PUBLICATIONS

The International Search Report for the corresponding international application No. PCT/JP2014/067450, issued on Sep. 2, 2014.

*Primary Examiner* — John Walters
*Assistant Examiner* — Brian Swenson
(74) *Attorney, Agent, or Firm* — Global IP Counselors, LLP

(57) ABSTRACT

A work vehicle is provided with an engine, and engine compartment, a cooling chamber, a radiator, a cooling fan, a dividing wall, and a cover. The cooling fan is arranged inside the cooling chamber and discharges air toward a direction that is isolated from the engine compartment. The dividing wall separates the engine compartment and the cooling chamber. The dividing wall includes a passage opening that links the engine compartment and the cooling chamber. The cover includes a main cover section, and a connecting section. The main cover section is arranged inside the cooling chamber next to the dividing wall with a gap therebetween. The main cover section is arranged to face the passage opening. The connecting section includes an open region. The connecting section connects the main cover section and the dividing wall.

15 Claims, 5 Drawing Sheets

(56) References Cited

U.S. PATENT DOCUMENTS

| | | | | |
|---|---|---|---|---|
| 6,302,066 B1 * | 10/2001 | Steinmann | ............ | B60K 11/02 123/41.49 |
| 2005/0211483 A1 * | 9/2005 | Pfohl | ............ | B60K 11/04 180/68.1 |
| 2009/0188734 A1 * | 7/2009 | Braun | ............ | B60K 11/00 180/68.1 |

FOREIGN PATENT DOCUMENTS

| | | |
|---|---|---|
| JP | 2007-283801 A | 11/2007 |
| JP | 2011-178178 A | 9/2011 |
| JP | 2012-136846 A | 7/2012 |
| JP | 2013-11109 A | 1/2013 |
| JP | 5329009 B1 | 8/2013 |
| JP | 2014-25254 A | 2/2014 |

* cited by examiner

WORK VEHICLE

CROSS-REFERENCE TO RELATED APPLICATIONS

This application is a U.S. National stage application of International Application No. PCT/JP2014/067450, filed on Jun. 30 12, 2014.

BACKGROUND

1. Field of the Invention

The present invention relates to a work vehicle.

2. Background Information

A work vehicle is provided with an engine compartment. The engine compartment contains an engine. Various devices besides the engine are also contained in the engine compartment. For example, an exhaust post-processing unit is contained in the engine compartment of the work vehicle disclosed in Japanese Unexamined Patent Application Publication No. 2014-025254.

SUMMARY

When the engine or the various apparatus contained in the engine compartment radiate heat, this tends to increase the temperature in the engine compartment.

The present invention addresses this problem by suppressing an excessive increase in temperature in the engine compartment.

A work vehicle according to one aspect of the present invention is provided with an engine, an engine compartment, a cooling chamber, a heat exchanger, a cooling fan, a dividing wall, and a cover. The engine compartment contains the engine. The heat exchanger is arranged inside the cooling chamber. The cooling fan is arranged inside the cooling chamber and discharges air toward a direction that is isolated from the engine compartment. The dividing wall separates the engine compartment and the cooling chamber. The dividing wall includes a passage opening that links the engine compartment and the cooling chamber. The cover includes a main cover section, and a connecting section. The main cover section is arranged inside the cooling chamber next to the dividing wall with a gap therebetween. The main cover section is arranged facing the passage opening. The connecting section includes an open region. The connecting section connects the main cover section and the dividing wall.

According to this configuration, operation of the cooling fan induces a negative pressure inside the cooling chamber. As a result, hot air inside the engine compartment is evacuated toward the cooling chamber via the passage opening and the open region. Thus it is possible to suppress an excessive increase in temperature in the engine compartment. The main cover section further prevents foreign objects from entering the engine compartment from the cooling chamber via the passage opening.

Preferably, the open region includes a first opening, which opens upward, and a second opening, which opens downward. For instance high-pressured water may enter the cooling chamber from the vehicle width direction while washing the vehicle. According to this configuration, it is possible to prevent high-pressure water from entering the engine compartment via the open region when washing the vehicle because the open region has no openings in the vehicle width direction.

Preferably, the work vehicle is further provided with an overhang. The overhang protrudes from the dividing wall toward the cooling chamber above the passage opening. According to this configuration, the overhang prevents rainwater from entering into the engine compartment via the passage opening.

Preferably, the cooling fan is configured to rotate in a first rotation direction as well as a second rotation direction. The rotation of the cooling fan in the first rotation direction evacuates the inside of the cooling chamber. Furthermore, the rotation of the cooling fan in the second rotation direction takes air from outside into the cooling chamber.

Preferably, the work vehicle further includes an exhaust post-processing unit for processing exhaust discharged from the engine. The exhaust post-processing unit is arranged inside the engine compartment. The passage opening is arranged to face the exhaust post-processing unit. According to this configuration the air surrounding the exhaust post-processing unit, which tends to increase in temperature compared to other areas, is discharged toward the cooling chamber via the passage opening. As a result it is possible to more effectively suppress an excessive increase in temperature in the engine compartment.

Preferably, the exhaust post-processing unit includes a diesel particulate filtering device. The passage opening may be arranged facing the diesel particulate filtering device.

Preferably, the dividing wall includes a lower wall section and an upper wall section. The upper wall section is removably attached to the upper end of the lower wall section. The upper wall section may be attached to the lower wall section with a fastener for example.

Preferably, the cooling chamber is arranged behind the engine compartment. The cooling fan is arranged at the rear section of the cooling chamber and configured to discharge air inside the cooling chamber rearward. The main cover section is arranged between the passage opening and the cooling fan in the longitudinal direction.

According to the present invention it is possible to suppress an excessive increase in temperature in the engine compartment.

DESCRIPTION OF EXEMPLARY EMBODIMENTS

Figure 1:
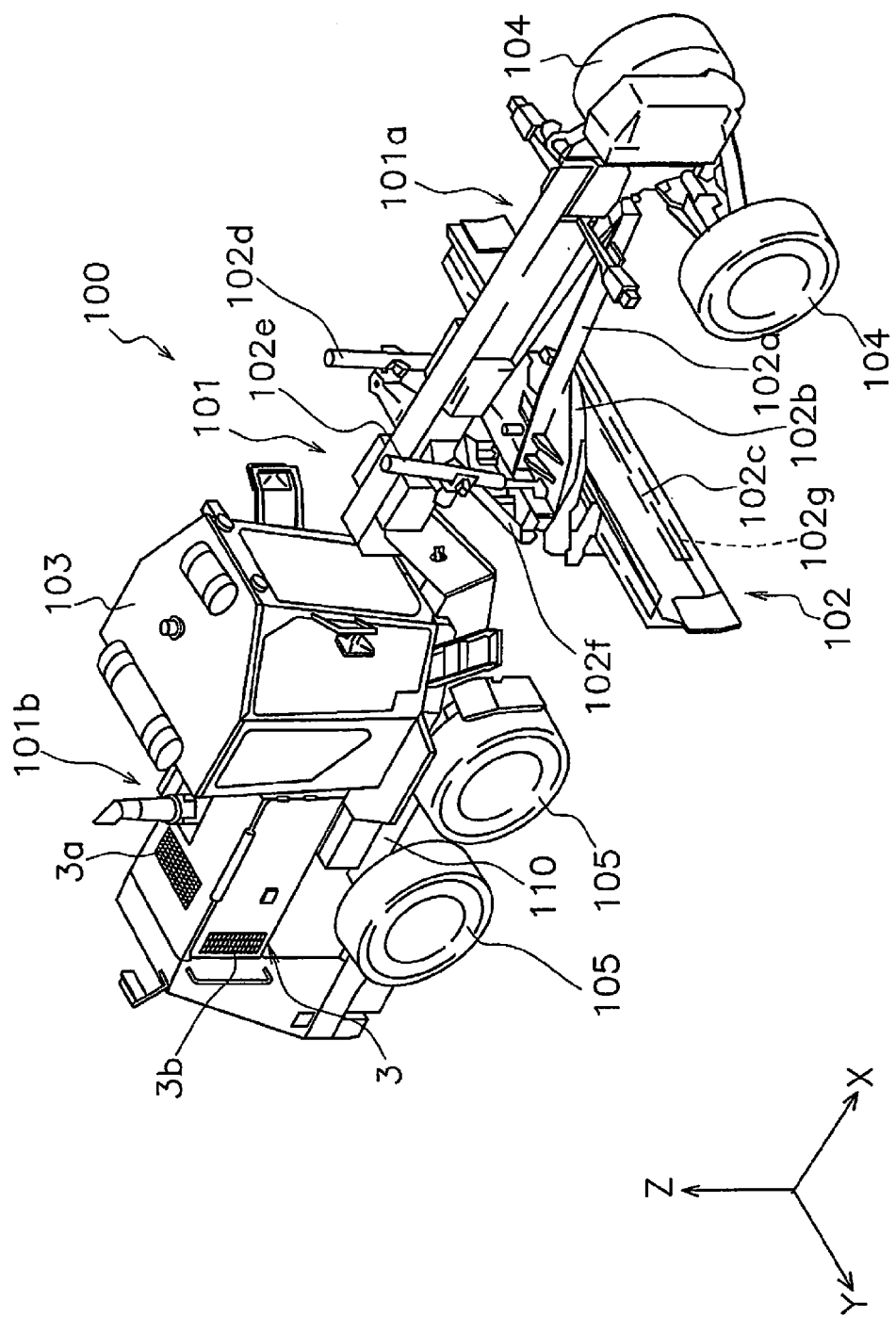
FIG. 1 is a perspective view of a motor grader.
Figure 2:
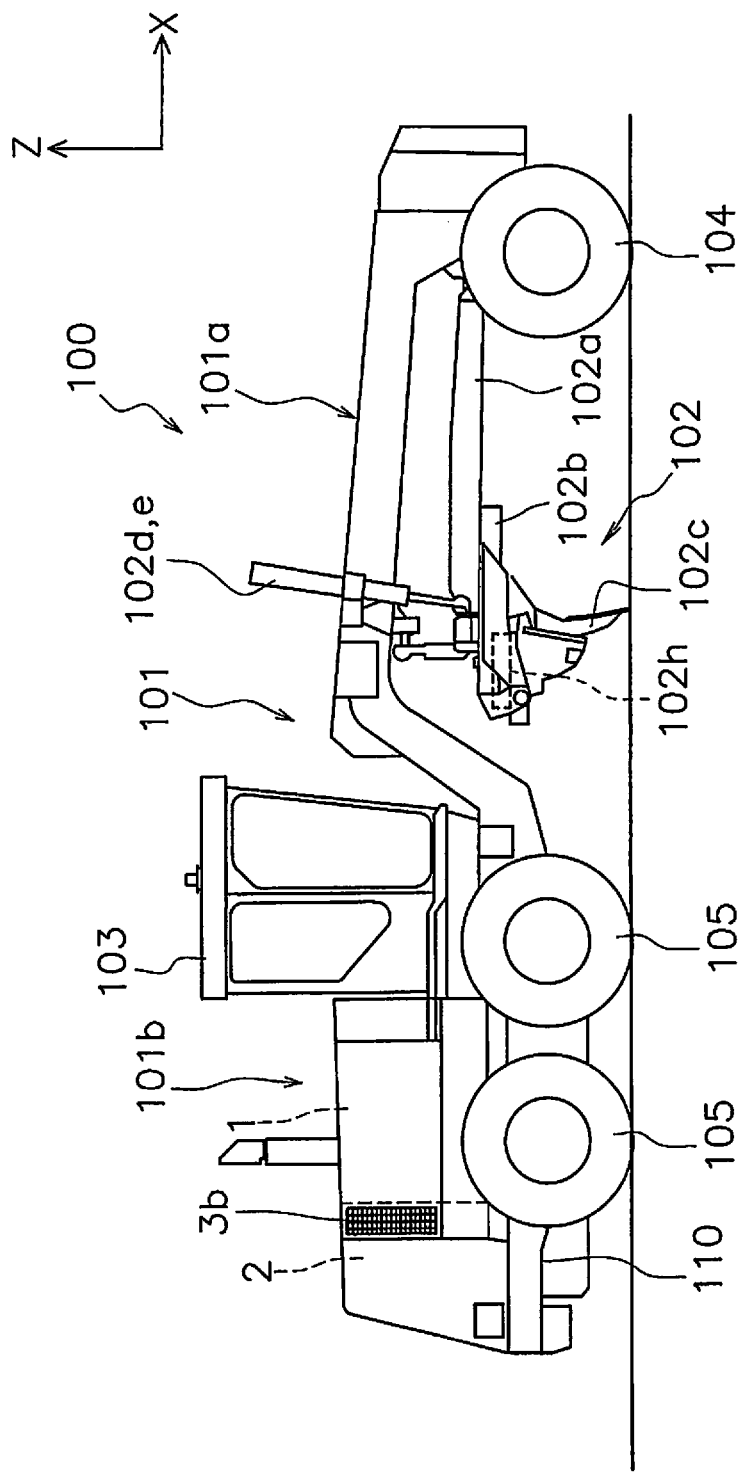
FIG. 2 is a side view of the motor grader.

A motor grader according to the exemplar embodiments will be described below with reference to the drawings. FIG. 1 is a perspective view of a motor grader. FIG. 2 is a side view of the motor grader. It is to be noted that in the following description "right", "left", "up", and "down" indicate the respective directions when looking frontward from the cabin. The term "vehicle width direction" is synonymous with the term "horizontal direction". Additionally, the term "longitudinal direction" means the longitudinal direction of the vehicle. In the drawings, the X-axis represents the longitudinal direction, the Y-axis represents the vehicle width direction, and the Z-axis represents the vertical direction.

As illustrated in FIG. 1 and FIG. 2, the motor grader 100 is provided with a vehicle body 101, a work implement 102, and a cab 103. The motor grader 100 may use the work implement 102 for soil preparation, snow removal, light cutting, or materials mixing.

The vehicle body 101 includes a front vehicle body 101a and a rear vehicle body 101b. The front vehicle body 101a includes a plurality (for instance, two) front wheels 104. Each of the front wheels 104 is arranged at the front section of the front vehicle body 101a.

The work implement 102 includes a drawbar 102a, a circle 102b, a blade 102c, and a plurality of hydraulic cylinders 102d-102h. The blade 102c can be raised and lowered vertically, change inclination longitudinally, change inclination horizontally, rotate, and shift horizontally via the drawbar 102a and the circle 102b.

The rear vehicle body 101b is located behind the front vehicle body 101a. The rear vehicle body 101b includes a plurality of (for instance, four) rear wheels 105. The rear wheels 105 are rotatably driven with drive power from the engine to thereby cause the motor grader 100 to move.

Figure 3:
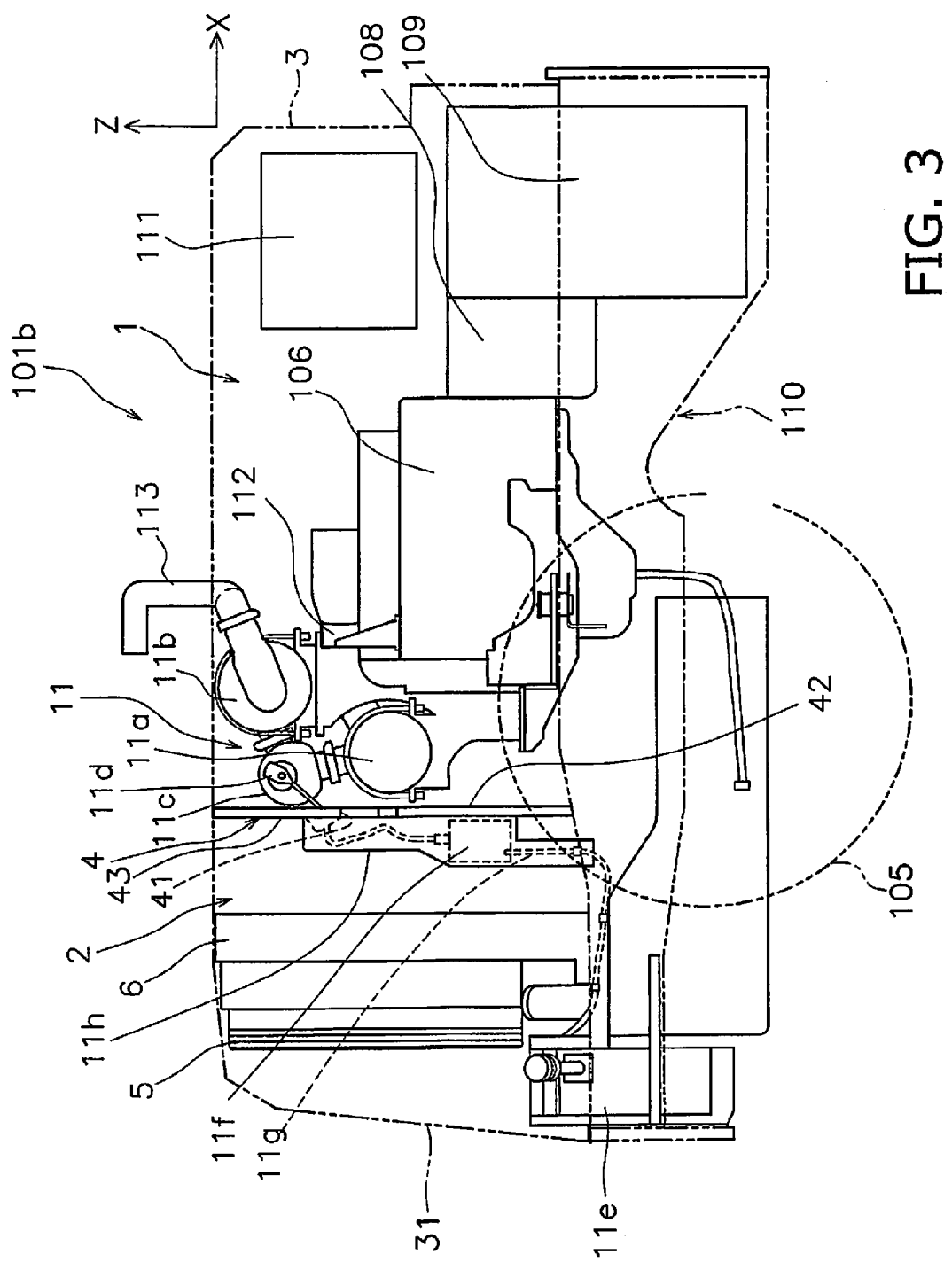
FIG. 3 is a side view illustrating the internal structure of a rear vehicle body.

FIG. 3 is a right side view illustrating the internal structure of the rear vehicle body. In FIG. 3 the vehicle frame 110, the vehicle body cover 3, and the rear wheels 105 are represented with long-dash double short-dash lines. As illustrated in FIG. 3, the rear of vehicle body 101b includes the engine compartment 1 and the cooling chamber 2.

The engine compartment 1 houses an engine 106, and an exhaust post-processing unit 11, and the like. The engine compartment 1 also houses a torque converter 108, a transmission 109, and a hydraulic fluid tank 111.

The vehicle body cover 3 defines the engine compartment 1. More specifically, the vehicle body cover 3 defines the upper surface and both side surfaces of the engine compartment 1. The rear surface of the engine compartment 1 is defined by the later described dividing wall 4.

As illustrated in FIG. 1, the vehicle body cover 3 includes a first outer-air intake 3a which links the cooling chamber 2 to the outside. The first outer-air intake 3a is formed by a plurality of through holes. The first outer-air intake 3a may be formed by a plurality of long holes, for example.

The vehicle body cover 3 includes an upper plate, a right side-plate, and a left side-plate. The upper plate, the right side-plate, and the left side-plate may be respectively individual components, or maybe a single component. The first outer-air intake 3a is formed in the upper plate of the vehicle body cover 3.

As illustrated in FIG. 3, the exhaust post-processing unit 11 is arranged inside the engine compartment 1. More specifically, the exhaust post-processing unit 11 is arranged in the rear section of the engine compartment 1. The exhaust post-processing unit 11 is configured to process exhaust discharged from the engine 106.

More specifically, the exhaust post-processing unit 11 includes a first post-processing device 11a, a second post-processing device 11b, and a connecting pipe 11c. The exhaust from the engine 106 is sent to the first post-processing device 11a via a piping 112. The exhaust processed by the exhaust post-processing unit 11 is externally discharged from an exhaust pipe 113.

In the present exemplary embodiment, the first post-processing device 11a is, for example, a diesel particulate filtering device. The first post-processing device 11a uses the filter to collect the particulates within the exhaust. The collected particulates are incinerated using a heater provided as an accessory for the filter.

The first post-processing device 11a is arranged in the rear section of the engine compartment 1. The first post-processing device 11a is arranged at the substantially vertical center of the engine compartment 1. The first post-processing device 11a has a roughly cylindrical outer shape. The central axis of the first post-processing device 11a extends along the vehicle width direction.

The second post-processing device 11b may be a selective catalytic reduction device. The exhaust discharged from the first post-processing device 11a is selectively reduced into nitrogen oxide (NOx) using a reductant. The second post-processing device 11b has a roughly cylindrical outer shape. The central axis of the second post-processing device 11b extends along the vehicle width direction.

The connecting pipe 11c connects the first post-processing device 11a and the second post-processing device 11b. The connecting pipe 11c has a roughly cylindrical outer shape. The central axis of the connecting pipe 11c extends along the vehicle width direction. The connecting pipe 11c is arranged above the first post-processing device 11a and in front of the second post-processing device 11b.

A reductant injector 11d is installed on the connecting pipe 11c. The reductant injector 11d injects a reductant into the connecting pipe 11c. For instance, the reductant injector may inject an aqueous urea solution into the connecting pipe 11c. The reductant is taken up from a reductant tank 11e by a pump 11f and supplied to the reductant injector 11d via a piping 11g. The aqueous urea solution injected into the connecting pipe 11c is hydrolyzed by the heat of the exhaust and turns into ammonia. The ammonia along with the exhaust is supplied to the second post-processing device 11b via the connecting pipe 11c.

The engine 106, the piping 112, the first post-processing device 11a, the connecting pipe 11c, the second post-processing device 11b, and the exhaust pipe 113 are connected in series in this order. Accordingly the exhaust from the engine 106 passes through the piping 112 and is sent to the first post-processing device 11a. The first post-processing device 11a processes mainly the particulates within the exhaust. The second post-processing device 11b processes mainly the NOx.

The cooling chamber 2 is arranged behind the engine compartment 1. The cooling chamber 2 houses a cooling fan 5 and a radiator 6. The radiator 6 cools the coolant in the engine 106. The dividing wall 4 isolates the engine compartment 1 and the cooling chamber 2 from each other. The radiator 6 corresponds to the heat exchanger in the exemplary embodiments of the present invention.

The vehicle body cover 3 defines the cooling chamber 2. More specifically, the vehicle body cover 3 defines the upper surface and both side surfaces of the cooling chamber 2. The dividing wall 4 defines the front surface of the cooling chamber 2. The front section of the vehicle body cover 3 defines the engine compartment 1, and the rear section of the vehicle body cover 3 defines the cooling chamber 2.

As illustrated in FIG. 1 and FIG. 2, a second outer-air intake 3b formed in the vehicle body cover 3 links the cooling chamber 2 to the outside. The second outer-air intake 3b is formed by a plurality of through holes. The second outer-air intake 3b is formed in at least one of the right side-plate and the left side-plate of the vehicle body cover 3.

As illustrated in FIG. 3, the cooling fan 5 discharges the air inside the cooling chamber 2 to the outside. The cooling fan 5 is capable of rotating in first and second rotation directions. Moreover, the first rotation direction and the second rotation direction are mutually opposite directions. The rotation of the cooling fan 5 in the first rotation direction evacuates air from the inside the cooling chamber 2. The rotation of the cooling fan 5 in the second rotation direction takes air into the cooling chamber 2 from the outside. The cooling fan 5 is arranged behind the radiator 6. The rear surface of the cooling chamber 2 is defined by a gill 31.

During normal operation, the cooling fan 5 rotates in the first rotation direction and expels the air inside the cooling chamber 2 to outside via the grill 31. That is, the cooling fan 5 creates an airflow inside the cooling chamber 2 that is oriented rearward.

Whereas, when cleaning the radiator 6 and the like, the cooling fan 5 rotates in the second rotation direction and takes air into the cooling chamber 2 from the outside via the grill 31. That is, the cooling fan 5 creates an airflow inside the cooling chamber 2 that is oriented frontward. Hereby, refuse and the like adhered to the radiator 6, for example, can be removed therefrom.

The dividing wall 4 is configured to separate the engine compartment 1 and the cooling chamber 2. More specifically, the dividing wall 4 is a panel. The dividing wall 4 extends from the right side-plate to the left side-plate of the vehicle body cover 3 in the vehicle width direction. The dividing wall 4 also extends vertically from the upper plate of the vehicle body cover 3 to the vehicle frame 110. The dividing wall 4 includes a passage opening 41 that links the engine compartment 1 and the cooling chamber 2.

The dividing wall 4 includes a lower wall section 42 and an upper wall section 43. The upper wall section 43 is removably attached to the upper end of the lower wall section 42. For instance, the upper wall section 43 is attached to the lower wall section 42 with a fastener, such as a bolt. The above described passage opening 41 is formed, for instance, in the upper wall section 43.

The passage opening 41 is arranged to face the exhaust post-processing unit 11. More specifically, the passage opening 41 is arranged to face the diesel particulate filtering device 11a. The passage opening 41 presents a substantially rectangular shape when viewed from behind; however the passage opening 41 is not particularly limited to this shape.

Figure 4:
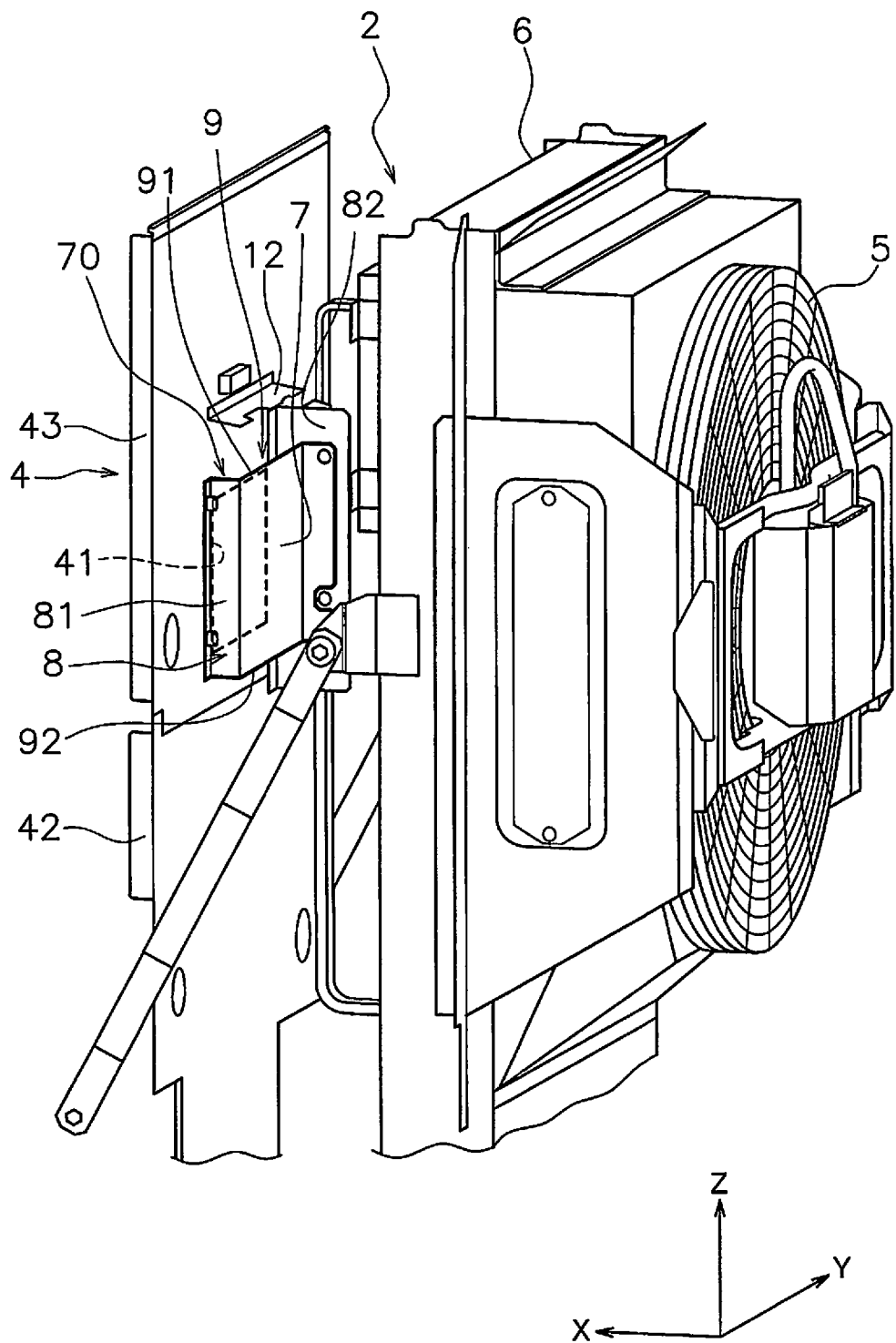
FIG. 4 is a perspective view illustrating the internal structure of a cooling chamber.

FIG. 4 is a perspective view illustrating the internal structure of a cooling chamber. The vehicle body cover 3 is omitted from FIG. 4. As illustrated in FIG. 4, the cover 70 includes a main cover section 7, and a connecting section 8. The cover 70 may be made from a single part, or may be made from a plurality of parts.

The main cover section 7 is arranged to face the passage opening 41. The main cover section 7 is also arranged inside the cooling chamber 2 next to the dividing wall 4 with a gap therebetween. Therefore, there is a space formed between the main cover section 7 and the dividing wall 4. More specifically, there is a space formed between the main cover section 7 and the passage opening 41. The main cover section 7 may be longitudinally separated from the dividing wall 4 by a distance of roughly 30 mm to 50 mm inclusive; however the separation of the main cover section 7 and the dividing wall 4 is not particularly limited to this distance.

When viewed from behind, the main cover section 7 appears to completely cover the passage opening 41. That is, the area of the main cover section 7 is greater than the area of the passage opening 41. The main cover section 7 is made into a panel which, when viewed from behind, presents a rectangular shape. The main cover section 7 is arranged substantially parallel to the dividing wall 4.

The connecting section 8 connects the main cover section 7 and the dividing wall 4. The connecting section 8 includes a first connecting section 81 and a second connecting section 82. The first and second connecting sections 81, 82 protrude from the dividing wall 4 toward the cooling chamber 2. That is, the first and second connecting sections 81, 82 protrude rearward from the dividing wall 4.

The first connecting section 81 is arranged on a first side of the passage opening 41 in the vehicle width direction. More specifically, the first connecting section 81 is arranged on the left side of the passage opening 41. The second connecting section 82 is arranged on a second side of the passage opening 41 in the vehicle width direction. More specifically, the second connecting section 82 is arranged on the right side of the passage opening 41.

The first and second connecting sections 81, 82 extend vertically. The first connecting section 81 is made from the same component as the main cover section 7. Namely, the first connecting section 81 and the main cover section 7 are made from a single component. More specifically, the main cover section 7 and the first connecting section 81 may be made by bending a single panel.

The second connecting section 82 is made from a panel. A box 11h for storing the above described pump 11f and the like may be attached to the second connecting section 82.

The connecting section 8 includes an open region 9. The open region 9 includes a first opening 91, and a second opening 92. The first opening 91 is formed between the upper end of the first connecting section 81 and the upper end of the second connecting section 82. The second opening 92 is formed between the lower end of the first connecting section 81 and the lower end of the second connecting section 82. The first opening section 91 opens upward; the second opening section 92 opens downward.

An overhang 12 is arranged above the passage opening 41. More specifically, when viewed from behind, the overhang 12 is arranged directly above the passage opening 41. The overhang 12 protrudes from the dividing wall 4 toward the cooling chamber 2. That is, the overhang 12 protrudes rearward from the dividing wall 4. The overhang 12 has a substantially rectangular shape in plan view.

The motor grader 100 according to the exemplary embodiment of the present embodiment operates in the following manner.

First, the cooling fan 5 rotates in the first rotation direction to cool the coolant flowing through the radiator 6. That is, the cooling fan 5 discharges the air inside the cooling chamber 2 rearward. A negative pressure is thus created inside the cooling chamber 2. As a result, outside air is taken into the cooling chamber 2 via the first outer-air intake 3a, and the second outer-air intake 3b. Thus, the coolant flowing in the radiator 6 may be cooled using outside air.

The cooling fan 5 discharges the air inside the cooling chamber 2 rearward, and thus the hot air inside the engine compartment 1 flows towards the cooling chamber 2 via the passage opening 41 and the open region 9. The passage opening 41 faces the exhaust post-processing unit 11 and thus mainly the air surrounding the exhaust post-processing unit 11 flows towards the cooling chamber 2. In this manner, the hot air inside the engine compartment 1 is discharged towards the cooling chamber 2 to thereby suppress an excessive increase in temperature in the engine compartment 1.

Additionally, the cooling fan 5 may be made to rotate in the second rotation direction during cleaning to remove the refuse and the like stuck to the radiator 6. Hereby, outside air may be taken into the cooling chamber 2. That is, the cooling fan 5 creates an airflow inside the cooling chamber 2 that is oriented frontward. Hereby, refuse and the like stuck to the radiator 6 can be removed therefrom. Moreover, the main cover section 7 is arranged to face the passage opening 41, and this therefore prevents refuse and the like removed from the radiator 6 from entering into the engine compartment 1 via the passage opening 41.

MODIFICATION EXAMPLES

Here ends the description of an exemplary embodiment of the present invention; the present invention is not limited to these descriptions, but may be modified in various ways insofar as the modifications do not deviate from the spirit of the present invention.

First Modification Example

Figure 5:
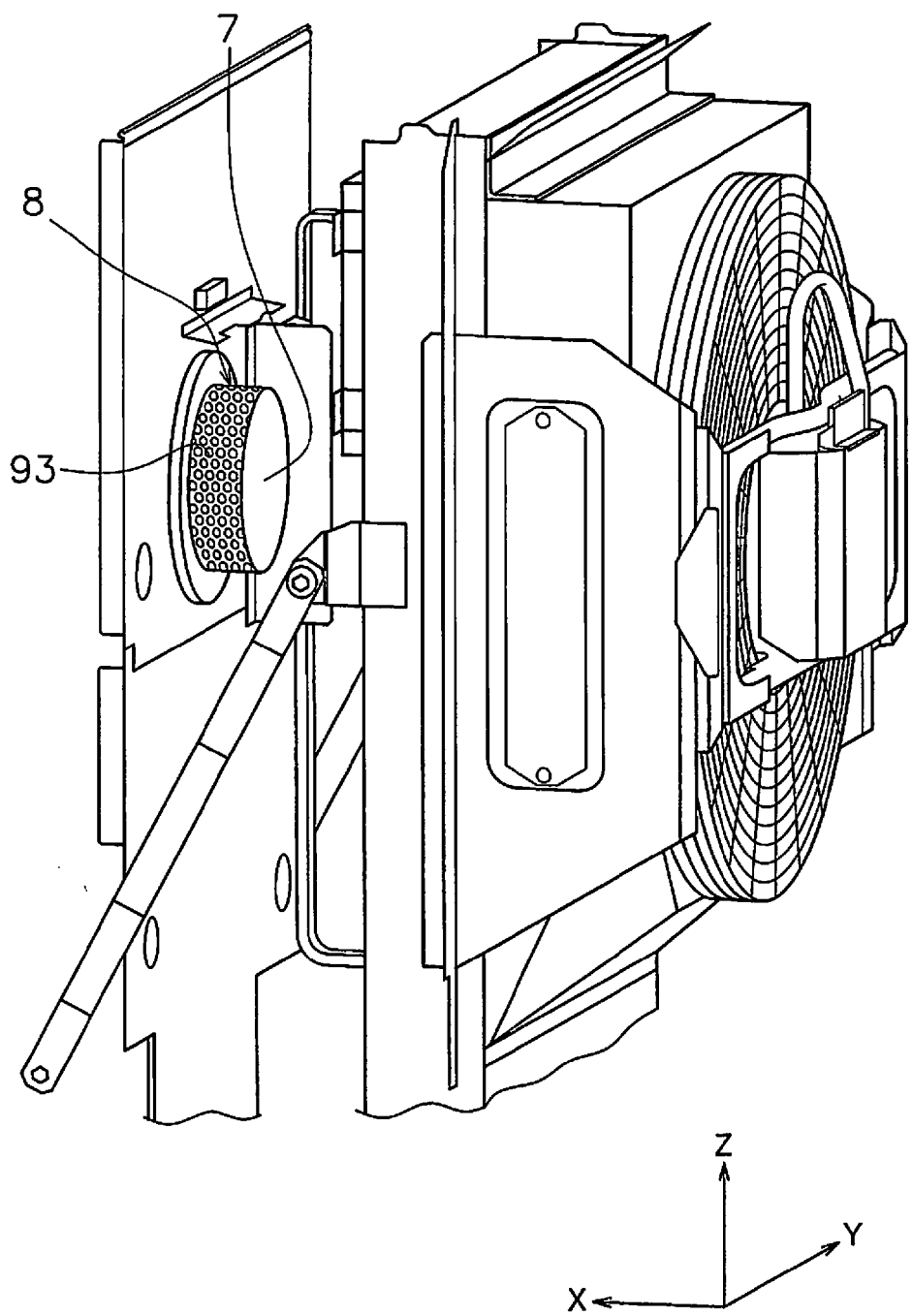
FIG. 5 is a perspective view illustrating the internal structure of a cooling chamber according to a first modification example.

In the above exemplary embodiment, the open region 9 is formed by the gap between the first connecting section 81 and the second connecting section 82, however the open region 9 is not limited to this configuration. For example, the open region 9 may be constituted by a through hole formed in the connecting section 8. For example, the open region 9 may be constituted by a plurality of through holes formed in the connecting section 8. More specifically, as illustrated in FIG. 5, the connecting section 8 may be a cylinder wherein a plurality of through holes 93 is formed.

Second Modification Example

The configuration of the connecting section 8 is not limited to the above described exemplary embodiments. For example, the first connecting section 81 and the main cover section 7 may be made from different components. Additionally, the second connecting section 82 and the main cover section 7 may be made from a single component. Furthermore, the first connecting section 81, the second connecting section 82, and the main cover section 7 may be made from a single component. More specifically, the first connecting section 81, the second connecting section 82, and the main cover section 7 may be made by bending a single panel.

Third Modification Example

The passage opening 41 may not present a substantially rectangular shape when viewed from behind. For example, the passage opening 41 may present a circular shape when viewed from behind. Additionally, the passage opening 41 may be constituted by a plurality of through holes.

Fourth Modification Example

In the above exemplary embodiments, the first opening 91 opens upward, and the second opening 92 opens downward; however, the openings are not particularly limited to being oriented in this manner. The openings are acceptable so long as the openings open in a direction substantially parallel to the dividing wall 4. For example, the first opening 91 may open toward a first side in the vehicle width direction, and the second opening 92 may open toward a second side in the vehicle width direction. More specifically, the first opening 91 may open towards the left side, and the second opening 92 may open towards the right side.

The invention claimed is:
1. A work vehicle comprising:
an engine;
an engine compartment for housing the engine;
a cooling chamber;
a heat exchanger arranged inside the cooling chamber;
a cooling fan arranged inside the cooling chamber and configured to discharge air toward a direction that is isolated from the engine compartment;
a dividing wall for separating the engine compartment and the cooling chamber, the dividing wall including a passage opening linking the engine compartment and the cooling chamber; and
a cover including a main cover section and a connecting section, the main cover section being arranged inside the cooling chamber next to the dividing wall with a gap therebetween, the main cover section being arranged to face the passage opening, the connecting section connecting section including an open region for coupling the main cover section and the dividing wall,
the open region including a first opening which opens upward and a second opening which opens downward.
2. The work vehicle according to claim 1, further comprising
an overhang protruding from the dividing wall toward the cooling chamber above the passage opening.
3. The work vehicle according to claim 1, wherein
the cooling fan is configured to rotate in a first rotation direction to discharge air from inside the cooling chamber, and to rotate in a second rotation direction to take in air from the outside into the cooling chamber.
4. The work vehicle according to claim 1, further comprising
an exhaust post-processing unit arranged inside the engine compartment for processing exhaust discharged from the engine; wherein,
the passage opening is arranged to face the exhaust post-processing unit.
5. The work vehicle according to claim 4, wherein
the exhaust post-processing unit includes a diesel particulate filtering device; and
the passage opening is arranged to face the diesel particulate filtering device.
6. The work vehicle according to claim 4, wherein
the exhaust post-processing unit has a first post-processing device extending along a vehicle width direction,
the first post-processing device is disposed between the engine and the passage opening in the longitudinal direction of the vehicle, and
the passage opening is arranged to face the first post-processing device.
7. The work vehicle according to claim 1, wherein
the dividing wall includes a lower wall section, and an upper wall section removably attached to the upper end of the lower wall section.
8. The work vehicle according to claim 1, further comprising
an overhang protruding from the dividing wall toward the cooling chamber above the passage opening.
9. The work vehicle according to claim 8, wherein
the cooling fan is configured to rotate in a first rotation direction to discharge air from inside the cooling chamber, and to rotate in a second rotation direction to take in air from the outside into the cooling chamber.
10. The work vehicle according to claim 9, further comprising
an exhaust post-processing unit arranged inside the engine compartment for processing exhaust discharged from the engine; wherein,
the passage opening is arranged to face the exhaust post-processing unit.

11. The work vehicle according to claim 10, wherein
the exhaust post-processing unit includes a diesel particulate filtering device; and
the passage opening is arranged to face the diesel particulate filtering device.

12. The work vehicle according to claim 11, wherein
the dividing wall includes a lower wall section, and an upper wall section removably attached to the upper end of the lower wall section.

13. The work vehicle according to claim 1, wherein
the cooling fan is configured to discharge air toward the direction that is isolated from the engine compartment during operating the work vehicle.

14. The work vehicle according to claim 1, wherein
the engine compartment is linked to the cooling chamber through the entire passage opening and the entire open region.

15. The work vehicle according to claim 1, wherein
the passage opening is defined only by an inner wall of a through hole formed on the dividing wall.

* * * * *